Feb. 8, 1966    G. W. BELL ETAL    3,234,562
ALKALI METAL BOROHYDRIDE AND BORON
HALIDE DETERMINATION PROCESS
Filed Nov. 17, 1960    2 Sheets-Sheet 1

Gorden W. Bell
Grady C. Carroll
INVENTORS.

BY Adams, Forward and McLean

ATTORNEYS

Feb. 8, 1966 G. W. BELL ETAL 3,234,562
ALKALI METAL BOROHYDRIDE AND BORON
HALIDE DETERMINATION PROCESS
Filed Nov. 17, 1960 2 Sheets-Sheet 2
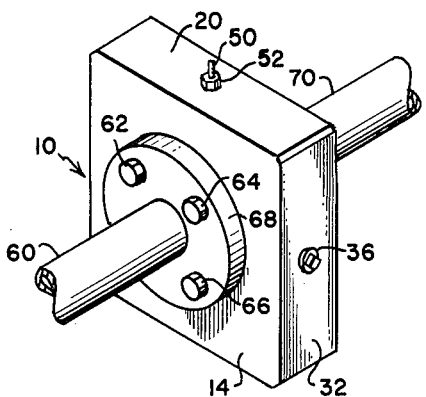
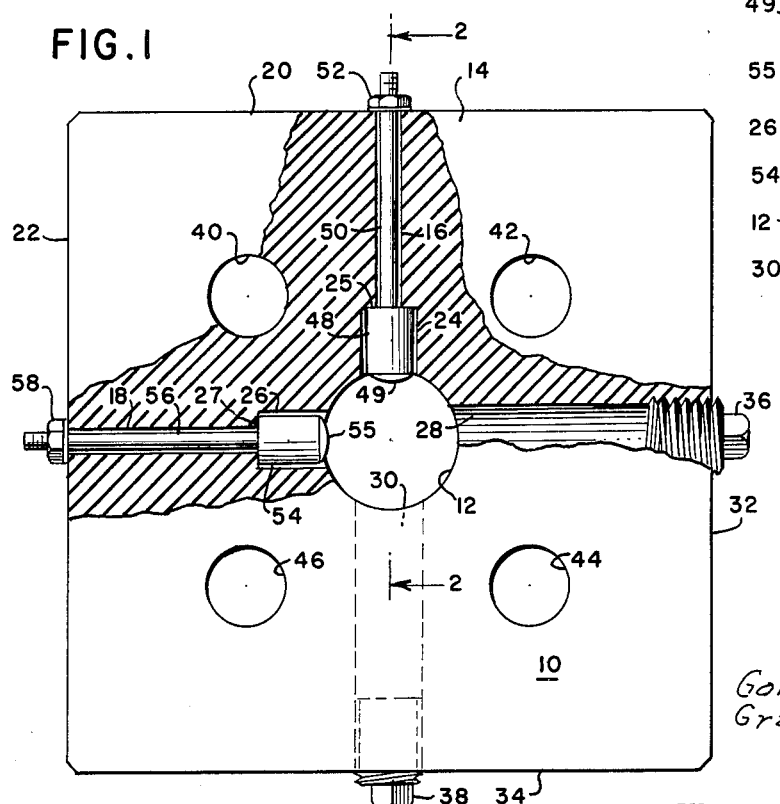
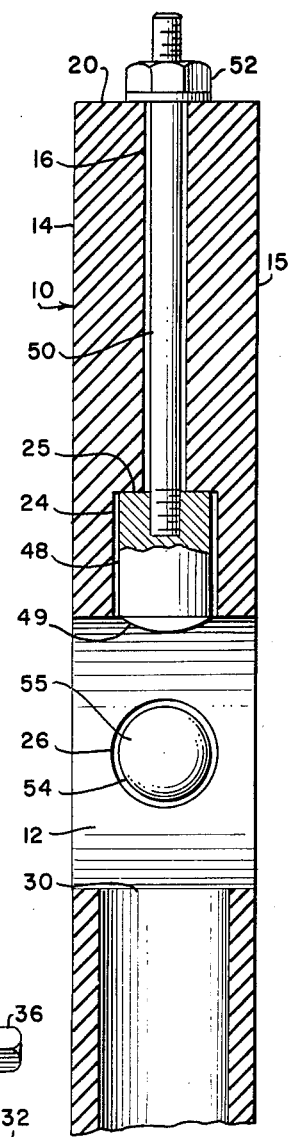
Gorden W. Bell
Grady C. Carroll
INVENTORS.
BY Adams, Forward and McLean
ATTORNEYS

United States Patent Office 3,234,562
Patented Feb. 8, 1966

3,234,562
ALKALI METAL BOROHYDRIDE AND BORON HALIDE DETERMINATION PROCESS
Gordon W. Bell, Marion, Ill., and Grady C. Carroll, Lillie, La., assignors, by mesne assignments, to the United States of America as represented by the Secretary of the Air Force
Filed Nov. 17, 1960, Ser. No. 70,072
7 Claims. (Cl. 204—1)

This invention relates to a method for measuring the concentration of an alkali metal borohydride and a boron halide. More particularly, it relates to the detection and control of the concentrations of such materials in the production of boron hydrides, specifically diborane.

In the production of diborane in accordance with a two stage process in the first stage of which an alkali methyl hydride slurried in diethyl ether is reacted with diborane recycled from the second reaction stage to produce an alkali metal borohydride, and in the second stage of which the alkali metal borohydride slurried in diethyl ether is reacted with a boron halide to produce diborane and an alkali metal halide, it has been found that to establish a stoichiometrically efficient operation and therefore an economically advantageous process it is necessary to control the borohydride concentration in the effluent from the second stage reaction.

It is an object of this invention to provide a method for measuring the concentration in a diethyl ether solution of an alkali metal borohydride or a boron halide.

It is another object of this invention to provide a method for detecting whichever of an alkali metal borohydride or a boron halide is present in a diethyl ether solution and measuring the concentration of whichever material is present in the solution.

It is a further object of this invention to provide an apparatus which embodies the method of this invention.

Briefly, this invention provides a method for measuring the concentration in a diethyl ether solution of an alkali metal borohydride or a boron halide by introducing a silver electrode and an antimony electrode into the solution thereby generating an electromotive force. The direction of the E.M.F. generated depends upon which of the materials is present in the solution and the magnitude of the E.M.F. depends upon the concentration of the material in the solution. Thus, this invention provides a method which not only measures concentrations of an alkali metal hydride or a boron halide but also distinguishes between the two types of material.

Advantageously, a device embodying our invention can be installed in the line carrying the effluent stream from a vessel in which an alkali metal hydride slurried in diethyl ether has been reacted with diborane to produce an alkali metal borohydride. Inasmuch as the magnitude of the E.M.F. generated is dependent upon the concentration of alkali metal borohydride in the diethyl ether solution by the simple expedient of calibrating a voltmeter, it is then possible to control accurately the addition rate of one of the reactants to prevent a stoichiometric excess of either the diborane or alkali metal hydride from being introduced.

A similar device can be installed in the line carrying the effluent stream from a vessel in which an alkali metal borohydride slurried in diethyl ether is reacted with a boron halide to produce diborane whereby the presence of either the free alkali metal borohydride or the free boron halide can be detected. It is then possible to control accurately the addition rate of one of the reactants so as to prevent a stoichiometric excess of either the alkali metal borohydride or the boron halide from being introduced.

To illustrate our invention more clearly, reference is made to the drawings in which:

FIGURE 1 is a partially sectioned view of a cell embodying our invention.

FIGURE 2 is an enlarged partially sectioned view of the cell taken along the line 2—2 of FIGURE 1.

FIGURE 3 is an isometric showing a cell embodying our invention installed in a flow line.

Figure 4:
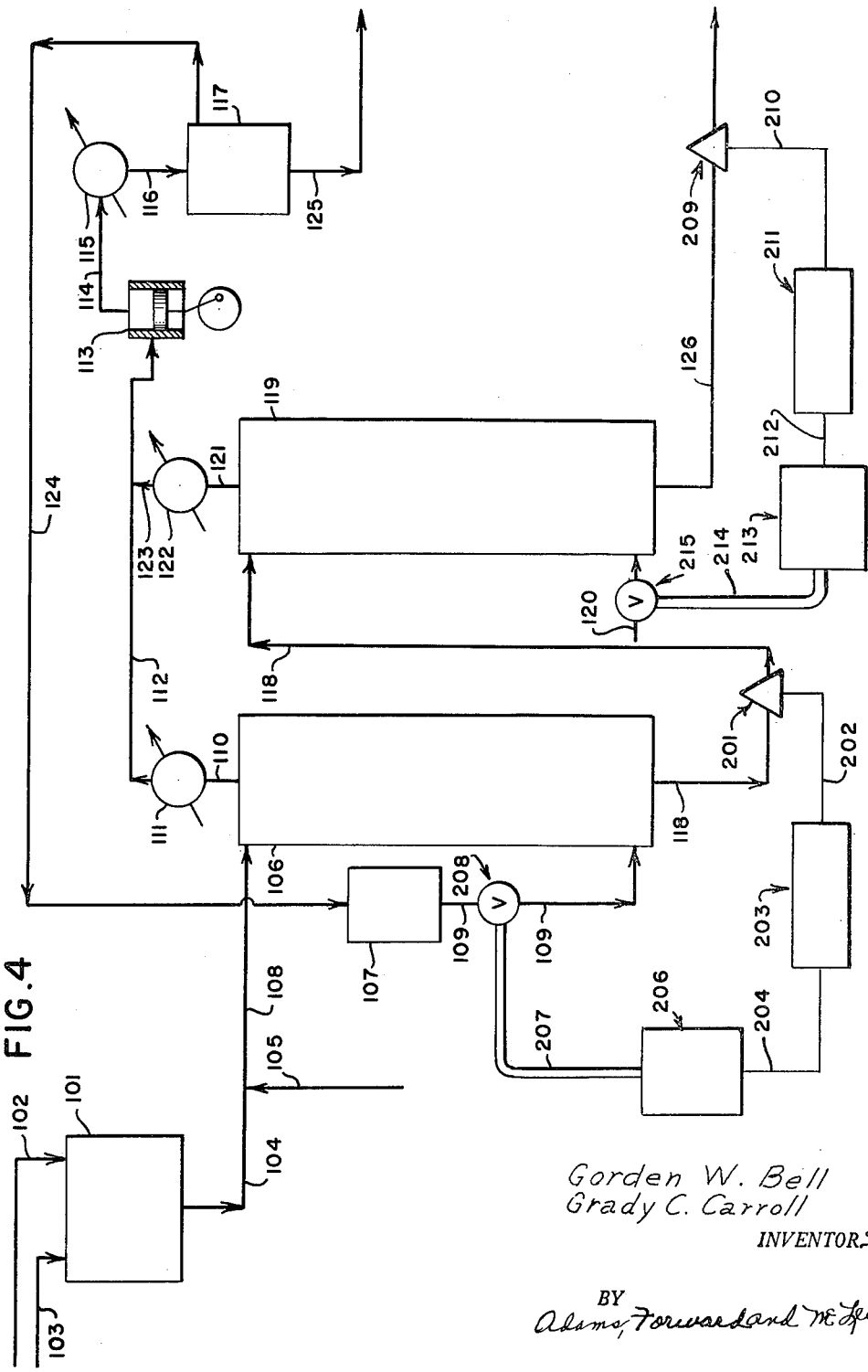
FIGURE 4 is a schematic diagram showing the installation and method of operation of the cell of our invention in a diborane synthesis operation.

FIGURES 1 and 2 show a cell of our invention, the body of which is a flat square block 10 composed of an inert insulating material having two opposing square faces 14 and 15 and four equidimensional rectangular faces 20, 22, 32 and 34. Faces 20 and 34 and faces 22 and 32 are respectively opposing. In block 10 is cylindrical passageway 12 centrally located within the square face 14 and having its axis perpendicular to face 14. Also, within block 10 are cylindrical passageways 16 and 18 centrally located within rectangular faces 20 and 22, respectively, so that their axes are perpendicular to each other and perpendicular to the axis of passageway 12. Positioned coaxially with passageways 16 and 18 are cylindrical pasageways 24 and 26, respectively, having diameters greater than pasageways 16 and 18 thereby forming shoulders 25 and 27, and positioned between passageways 16 and 18 and passageway 12, providing communiction therebetween. Positioned coaxially with passageways 16 and 24 and passageways 18 and 26, are cylindrical passageways 28 and 30 respectively, at least equal in diameter to passageways 24 and 26 located opposite passageway 12 from passageways 24 and 26, respectively. Passageways 28 and 30 each provide communication between passageway 12 and the exterior of block 10 through rectangular faces 32 and 34, respectively. The ends of passageways 28 and 30 remote from passageway 12 are threaded to receive plugs 36 and 38, respectively. Also located in block 10 are four cylindrical passageways 40, 42, 44 and 46 positioned with their axes parallel to the axis of passageway 12. Passageways 40, 42, 44 and 46 are disposed an equal distance from the axis of passageway 12, one in each of the quadrants formed by the axes of passageways 18, 26 and 28 and passageways 16, 24 and 30, and an equi-arcuate distance from each of the axes bordering its respective quadrant.

Positioned within passageway 24 is cylindrically shaped silver electrode 48 of such dimension that its cylindrical length is equal to the cylindrical length of passageway 24. Positioned within passageway 16 is cylindrical brass rod 50 somewhat greater in length than passageway 16. The ends of rod 50 are threaded so as to engage electrode 48 at one end thereof and to engage nut 52 at the other end thereof. The end of electrode 48 remote from rod 50 is convex in shape, such that the entire convex portion 49 of electrode 48 extends into passageway 12. Similarly arranged in relation to passageways 18 and 26 are cylindrically shaped antimony electrode 54, with convex portion 55, brass rod 56 and nut 58.

By maintaining the brass rods 50 and 56 in a proper state of tension, the electrodes 48 and 54 are caused to bear against shoulders 25 and 27, respectively, thereby providing a liquid-tight seal. Plugs 36 and 38, when screwed tightly in place, also provide a liquid tight seal in passageways 28 and 30, respectively.

FIGURE 3 shows the cell of FIGURES 1 and 2 placed in a flow line. Flanged pipes 60 and 70 having an inner diameter equal to the diameter of passageway 12 are coupled to block 10 by means of four bolts (only three bolts 62, 64 and 66 are shown) placed through the flange 68 of pipe 60, passageways 40, 42, 44 and 46 and the flange (not shown) of pipe 70. A liquid tight means is thereby provided for bringing a flowing product stream in contact with the electrodes 48 and 54 without interrupting the flow of such stream. In operation, the convex portions 49 and 55 of the electrodes 48 and 54, respectively, are kept free of coating by the scrubbing action of the flowing product stream.

FIGURE 4 is a schematic diagram of a diborane synthesis operation similar to that described in application Serial No. 674,971 filed July 29, 1957, of Smith (Dec.) and Wood, now U.S. Patent No. 2,983,582, employing two cells of our invention and illustrating the method of operation of such cells.

The following example illustrates in detail an embodiment falling within the scope of this invention and is to be considered in conjunction with FIGURE 4.

*Example 1*

In FIGURE 4 the numeral 101 designates a feed slurry tank into which there are introduced by means of line 102, 86.1 pounds per hour of lithium hydride and 5.5 pounds per hour of lithium chloride normally associated with the lithium hydride as an impurity. Also introduced into tank 101 by means of line 103 is a mixture of 631 pounds per hour of recycle diethyl ether, 0.1 pound per hour of heavy organics dissolved from the lubricants used in the pumps, and 24.5 pounds per hour of low boiling impurities originally introduced into the system as impurities in the boron trichloride feed. The concentration of lithium hydride in the feed slurry leaving tank 101 is about 11.5% by weight.

To the material withdrawn from tank 101 by means of line 104 there is added by means of line 105 the following materials flowing at the following rates in pounds per hour: diborane, 200.6; diethyl ether, 16,703.7; lithium chloride, 16.8; heavy organics, 167; and low boiling impurities such as ethyl chloride originally introduced into the system as an impurity in the boron trichloride feed, 484.6. Thus, entering the first reactor 106 by means of line 108 is a reactant stream containing the following materials flowing at the following rates in pounds per hour: diborane 200.6; diethyl ether 17,334.7; lithium hydride, 86.1; lithium chloride, 16.8; low boiling impurities, 509.1; heavy organics, 167.2; and inorganic impurities, 5.5. Also, entering first reactor stage 106 is a mixed stream of 200 pounds per hour of diborane and 74 pounds per hour of diethyl ether together with 7.8 pounds per hour of low boiling material by way of line 109 leading from surge tank 107.

A mixture of 52.7 pounds per hour of diborane, 154 pounds per hour of diethyl ether, and 8.9 pounds per hour of low boiling impurities is withdrawn from reactor 106 through line 110 and passed through cooler 111, line 112, compressor 113, line 114, partial condenser 115 and line 116 to collector tank 117. There is also withdrawn from reactor 106 and passed by means of line 118 through cell 201, and line 118 to second reactor 119, a mixture of the following materials flowing at the following rates in pounds per hour: diborane, 197.9; diethyl ether, 16,451.7; lithium borohydride diethyl etherate, 1,039.1; lithium chloride, 16.8; low boiling impurities, 508; heavy organics, 167.3; inorganic impurities, 5.5. Also introduced into reactor 119 through line 120 and valve 215 are 423 pounds per hour of boron trichloride together with 9 pounds per hour of low boiling impurities.

There is withdrawn overhead from reactor 119 and passed by way of line 121, cooler 122, line 123, line 112, compressor 113, line 114, partial condenser 115, line 116, to collector tank 117, a mixture of 197.3 pounds per hour of diborane, 574 pounds per hour of diethyl ether and 33.3 pounds per hour of low boiling impurities.

From collector tank 117 there is withdrawn by means of line 125 and passed to a diborane recovery column (not shown) a mixture of 50 pounds per hour of diborane, 654 pounds per hour of diethyl ether and 34.4 pounds per hour of low boiling material. Also withdrawn from collector tank 117 by means of line 124 and passed to surge tank 107 is a mixed stream of 200 pounds per hour of diborane and 74 pounds per hour of diethyl ether together with 7.8 pounds per hour of low boiling material. This stream is passed through line 109, containing pneumatically controlled valve 208 into reactor 106 as a reactant stream.

There are withdrawn from reactor 119 through line 126 and passed through cell 209 to a centrifugal separator (not shown) the following materials flowing at the following rates in pounds per hour: diborane, 200.6; diethyl ether, 16,680.7; lithium chloride, 475.9; low boiling impurities, 483.7; heavy organics, 167.4; inorganic impurities, 5.5.

The effluent stream in line 118 passes through cell 201 whereby such lithium borohydride containing stream generates an electromotive force within cell 201. The electromotive force generated in cell 201 is carried by conductor 202 to amplifier 203 where such E.M.F. is amplified and transmitted to control circuit 206 by means of conductor 204. The amplified E.M.F. entering control circuit 206 controls a pneumatic output which is transmitted by pneumatic line 207 to pneumatically operated valve 208.

In operation, the electromotive force generated by cell 201 is dependent upon the concentration of lithium borohydride in the line 118. Since the input of lithium hydride to reactor 106 is a fixed quantity required to obtain a desired yield of lithium borohydride, the corresponding electromotive force from cell 201 can be determined and such value employed as a triggering voltage in control 206 to operate valve 208. Thus, a decrease in lithium borohydride product and a corresponding change in electromotive force from cell 201 operates to open further valve 208 causing a greater input of diborane and thereby permitting an increase in lithium borohydride formation.

It is important that all of the lithium hydride charged to first reactor 106 be converted to lithium borohydride since the presence of lithium hydride in the second reactor 119 causes a reduction in diborane product. The lithium hydride reacts with the product diborane to form solid lithium borohydride monoetherate which is removed with the by-products.

As the lithium borohydride and boron trichloride containing stream in line 126 is passed through cell 209, an electromotive force is generated by an excess of either the borohydride or the halide. The magnitude of the electromotive force generated by cell 209 indicates an excess over that stoichiometrically required to produce diborane of either the borohydride or the halide. The direction of the E.M.F. generated is dependent upon which of either the borohydride or the halide is present in stoichiometric excess. Such E.M.F. is passed by conductor 210 to amplifier 211. The amplified E.M.F. is transmitted by conductor 212 to control circuit 213 wherein such E.M.F. is employed to control the pneumatic output of control 213. This pneumatic output is transmitted by pneumatic line 214 to pneumatically operated valve 215 in line 120. Depending upon the excess concentration of one of the borohydride or the halide in 126 valve 215 in line 120 is controlled to admit a greater or lesser amount of the boron trichloride containing stream of line 120.

It is believed that the presence of the borohydride ion in the electrolyte is necessary for the operation of the cell of our invention. When the stream passing through the cell contains only anhydrous ether and lithium hydride there is a zero potential. However, if diborane is then added to the system, thereby reacting to produce lithium borohydride, an electromotive force is obtained. If an excess of boron trichloride is added to the system an opposite voltage is obtained. It has further been noted that the temperature of the stream passing through the cell can affect the voltage generated by the cell. This is because the cell is apparently sensitive only to that portion of the dissolved lithium borohydride and not to any undissolved lithium borohydride.

We claim:

1. A method for measuring the concentration in a flowing diethyl ether liquid solution of a material selected from the group consisting of alkali metal borohydrides and boron halides which comprises introducing a silver electrode and an antimony electrode into said liquid solution thereby generating an electromotive force, the direction of which depends upon which of said materials is present in said solution and the magnitude of which depends upon the concentration of said material in said solution.

2. A method for measuring the concentration of an alkali metal borohydride in an effluent stream from a reaction wherein an alkali metal hydride and diborane in ether solution are reacted to produce an alkali metal borohydride which comprises passing an effluent liquid stream from such a reaction as an electrolyte through a cell comprising an antimony electrode and a silver electrode thereby generating an electromotive force.

3. The method of claim 1 in which the alkali metal borohydride is lithium borohydride and the boron halide is boron trichloride.

4. The method of claim 1 in which the alkali metal borohydride is lithium borohydride and the boron halide is boron trifluoride.

5. A method for controlling the concentration of a stoichiometric excess of one of an alkali metal borohydride and a boron halide at a given level in an effluent liquid stream from the reaction $$3MBH_4 + BX_3 \rightarrow 2B_2H_6 + 3MX$$

in an ether solvent where M is an alkali metal and X is a halogen, which comprises passing said effluent stream from such reaction as an electrolyte through a cell comprising an antimony electrode and a silver electrode thereby generating an electromotive force and varying the amount of boron halide reactant introduced into such reaction so as to maintain such electromotive force at a predetermined value and polarity.

6. The method of claim 5 in which the alkali metal is lithium and the halogen is chlorine.

7. The method of claim 5 in which the alkali metal is lithium and the halogen is fluorine.

References Cited by the Examiner
UNITED STATES PATENTS

| | | | |
|---|---|---|---|
| 2,543,511 | 2/1951 | Schlesinger et al. | 23—204 |
| 2,805,191 | 9/1957 | Hersch | 204—195 |
| 2,898,282 | 8/1959 | Flook et al | 204—195 |
| 2,943,028 | 6/1960 | Thayer et al. | 204—195 |
| 2,992,170 | 7/1961 | Robinson | 204—195 |
| 3,028,317 | 4/1962 | Wilson et al. | 204—195 |
| 3,096,258 | 7/1963 | Poulos | 204—195 |

OTHER REFERENCES

Kishimoto, Chem. Abst., vol. 46 (1952), pp. 8548–9.
Novak, Chem. Abstr., vol. 49, page 12931e, 1955.
Pecsok, "J. of Am. Chem. Soc.," vol. 75 (1953), p. 2862.

JOHN H. MACK, *Primary Examiner.*

MAURICE A. BRINDISI, MURRAY TILLMAN, WINSTON A. DOUGLAS, *Examiners.*